(12) United States Patent
Papatla et al.

(10) Patent No.: US 7,647,325 B2
(45) Date of Patent: Jan. 12, 2010

(54) HARDWARE AND SOFTWARE IDENTIFIER CATEGORIZATION AND REVIEW

(75) Inventors: Ram P. Papatla, Sammamish, WA (US); John Leo Ellis, Sammamish, WA (US); Mario Hewardt, Sammamish, WA (US); David James Armour, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 286 days.

(21) Appl. No.: 11/623,308

(22) Filed: Jan. 15, 2007

(65) Prior Publication Data

US 2008/0172403 A1  Jul. 17, 2008

(51) Int. Cl.
*G06F 17/00* (2006.01)
(52) U.S. Cl. .................................. 707/10; 707/1; 707/2
(58) Field of Classification Search ................. 707/1–10
See application file for complete search history.

(56) References Cited

U.S. PATENT DOCUMENTS

| | | | |
|---|---|---|---|
| 6,195,657 B1* | 2/2001 | Rucker et al. ................... | 707/5 |
| 6,370,686 B1 | 4/2002 | Delo et al. | |
| 6,745,195 B1 | 6/2004 | Kornfein et al. | |
| 6,785,683 B1 | 8/2004 | Zodik et al. | |
| 7,047,293 B2 | 5/2006 | Motoyama et al. | |
| 7,130,863 B2 | 10/2006 | Diab | |
| 7,475,293 B1 | 1/2009 | Little et al. | |
| 2001/0047290 A1* | 11/2001 | Petras et al. ................... | 705/10 |
| 2002/0016786 A1* | 2/2002 | Pitkow et al. ................... | 707/3 |
| 2002/0133365 A1* | 9/2002 | Grey et al. ...................... | 705/1 |
| 2003/0018632 A1* | 1/2003 | Bays et al. ...................... | 707/3 |

(Continued)

OTHER PUBLICATIONS

Mena, Eduardo et al., An Agent-based Approach for Helping Users of Hand-Held Devices to Browse Software Catalogs, located at http://citeseer.ist.psu.edu/cache/papers/cs/26907/http:zSzzSznacho.cps.unizar. eszSzPUBLICATIONSzSzcia02.pdf/mena02agentbased. pdf, not dated, 15 pp., IIS Department, University of Zaragoza, Spain.

Mena, Eduardo et al., A Software Retrieval Service Based on Adaptive Knowledge-Driven Agents for Wireless Environments, located at http://sid.cps.unizar.es/PUBLICATIONS/POSTSCRIPTS/taas06. pdf, Sep. 2006, pp. 67-90, vol. 1, No. 1, ACM Transactions on Autonomous and Adaptive Systems, Spain.

(Continued)

*Primary Examiner*—Mohammad Ali
*Assistant Examiner*—John P Hocker
(74) *Attorney, Agent, or Firm*—Senniger Powers LLP

(57) ABSTRACT

A method for updating a catalog of hardware device and software object identifiers by identifying unknown identifiers and categorizing each of the unknown identifiers. The method further provides the categorized identifiers to a community of users for review and receives comments from the community of users on the provided categorization. The method further determines if the categorized identifiers should be recategorized based upon the received comments. Another method performs a search for an entity associated with an unknown identifier, determines a likely entity associated with the unknown identifier, and verifies the correctness of such determined likely entity. Another method generates a catalog of computer system components, receives information regarding the identity of a computer system component from at least two different sources, and determines the identity of the computer system component based upon the reputation of the sources of the received information.

19 Claims, 3 Drawing Sheets

U.S. PATENT DOCUMENTS

| | | | |
|---|---|---|---|
| 2003/0028451 A1* | 2/2003 | Ananian | 705/27 |
| 2003/0162537 A1 | 8/2003 | Hirsch | |
| 2004/0010456 A1 | 1/2004 | Hoang | |
| 2004/0193506 A1* | 9/2004 | Zmolek | 705/27 |
| 2004/0225541 A1 | 11/2004 | Porter et al. | |
| 2005/0022114 A1* | 1/2005 | Shanahan et al. | 715/513 |
| 2005/0027619 A1 | 2/2005 | Basak et al. | |
| 2005/0091647 A1* | 4/2005 | McCollum et al. | 717/130 |
| 2005/0154557 A1* | 7/2005 | Ebert | 702/182 |
| 2006/0095370 A1* | 5/2006 | Seth et al. | 705/40 |
| 2006/0200433 A1* | 9/2006 | Flinn et al. | 706/12 |
| 2006/0218246 A1 | 9/2006 | Fawcett | |
| 2006/0271923 A1 | 11/2006 | Bantz et al. | |
| 2008/0082565 A1* | 4/2008 | Chang et al. | 707/102 |
| 2008/0189326 A1* | 8/2008 | Norrie | 707/104.1 |

OTHER PUBLICATIONS

Filoni, Milco, Computing Assets Categorization According to Collected Configuration and Usage Information, located at http://luca.ntop.org/Teaching/Tesi/MirkoFiloni-Tesi.pdf, 2001, 184 pp., University of Pisa, Italy.

International Search Report and Written Opinion, International Application No. PCT/US2008/050200, dated May 30, 2008, 10 pages.

* cited by examiner

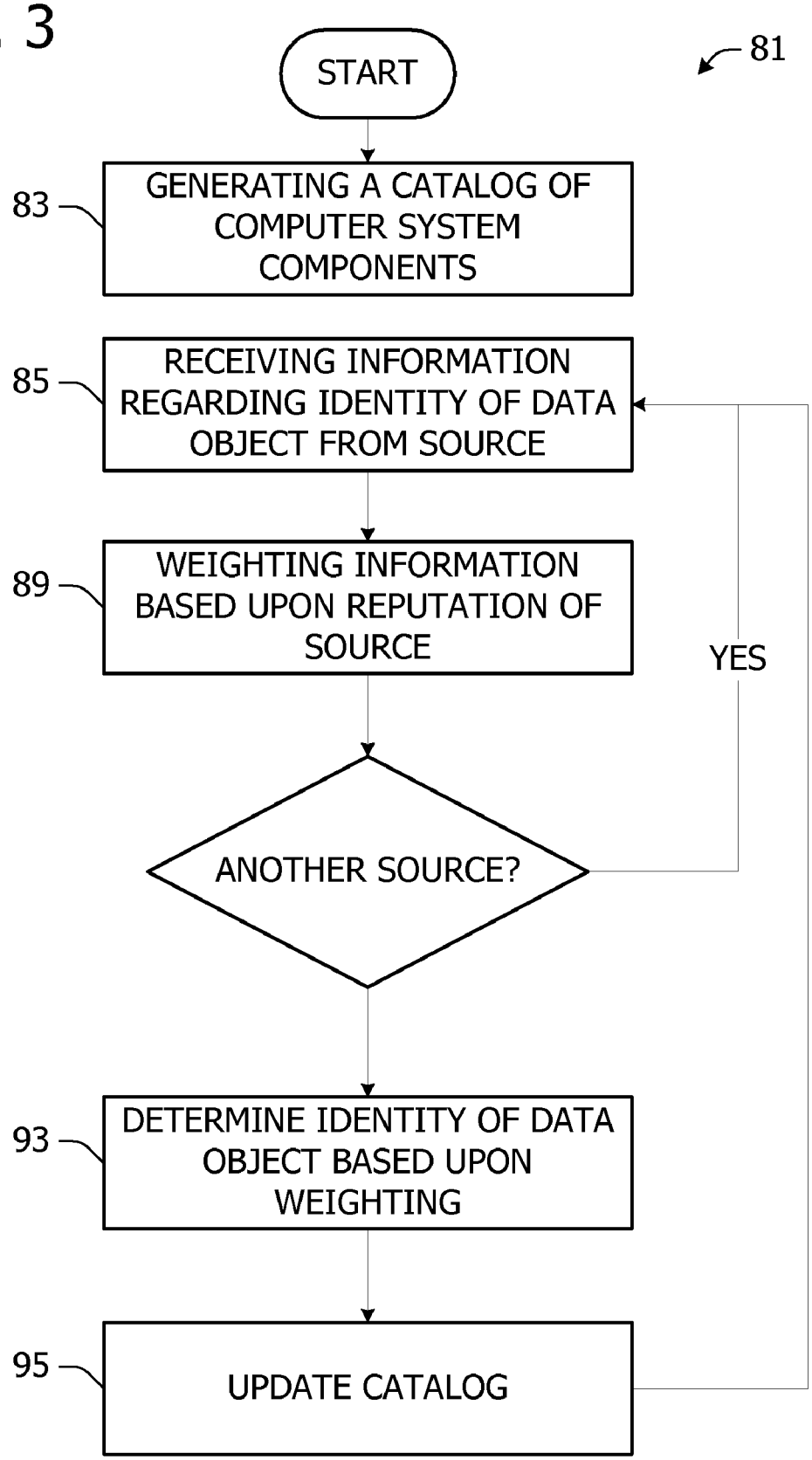

HARDWARE AND SOFTWARE IDENTIFIER CATEGORIZATION AND REVIEW

BACKGROUND

Conventional system management software provides multiple functionalities to users, which are typically information technology (IT) professionals managing groups of computing devices. Such conventional system management software is designed to facilitate IT professionals in the design, management, and maintenance of complex networks of computing devices. Typical functions include asset monitoring and management. For example, an agent is typically loaded onto each of the computing devices to collect information about the computing devices. This information typically includes hardware devices that are part of the computing device and software objects saved to the computing device, among others. Such hardware devices and software objects are typically defined by identifiers, or signatures, as would be understood by one skilled in the art. The agent collects information periodically, such as daily or weekly, and returns the information to the system management software. This collected information can be used to determine if the computing devices are being utilized properly, such as in compliance with corporate policies. The collected information can also be utilized to determine if each of the computing devices has sufficient hardware and software to support hardware or software upgrades. Other determinations can also be made with the collected information, as would be understood by one skilled in the art.

To correlate the collected information, which is in the form of identifiers, or signatures, such system management software must have access to a computerized catalog that correlates identifiers with particular hardware and software. In other words, as the agents collect identifier information, that identifier information must be translated into meaningful human-readable or machine-readable data. Because of the countless number of different hardware devices and software objects produced and published by thousands of different entities, the agents often find identifiers that are unknown, having no match in the catalog of the system management software. These unknown identifiers can lead to a significant reduction in the usefulness of the reports generated by the system management software. If IT professionals have access to the identifiers, but cannot readily ascertain what the identifiers mean, then their function as the arbiter of what content is included on computing device under their control is severely diminished.

Moreover, searches of a regional or global network, such as the Internet, can yield potential answers regarding the identification of many of these identifiers. But without a mechanism for verification of these potential identifier identities, their usefulness in such a catalog is diminished.

SUMMARY

The following simplified summary provides a basic overview of some aspects of the present technology. This summary is not an extensive overview. It is not intended to identify key or critical elements or to delineate the scope of this technology. Its purpose is to present some simplified concepts related to the technology before the more detailed description presented below.

Accordingly, aspects of the invention provide for the categorization of unknown data identifiers and for the consideration of those categorizations by a user community. Such consideration by a user community provides for peer review of the determined categorization, whereby input from the community can determine if the identifiers is to be recategorized. By providing such peer review, the accuracy of the categorization can be verified or improved. Aspects of the invention provide a way to search for an entity associated with an unknown identifier and verify the correctness of the determined entity. Aspects of the invention also provide a way to receive computer system component identity information from two or more sources and determine the identity of the computer system component based upon such information and the reputation of the sources.

BRIEF DESCRIPTION OF THE DRAWINGS

FIG. 3 is a flow diagram of a computer-implemented method of still another embodiment of the invention.

Corresponding reference characters indicate corresponding parts throughout the drawings.

DETAILED DESCRIPTION

Method for Updating Identifier Catalog

Figure 1:
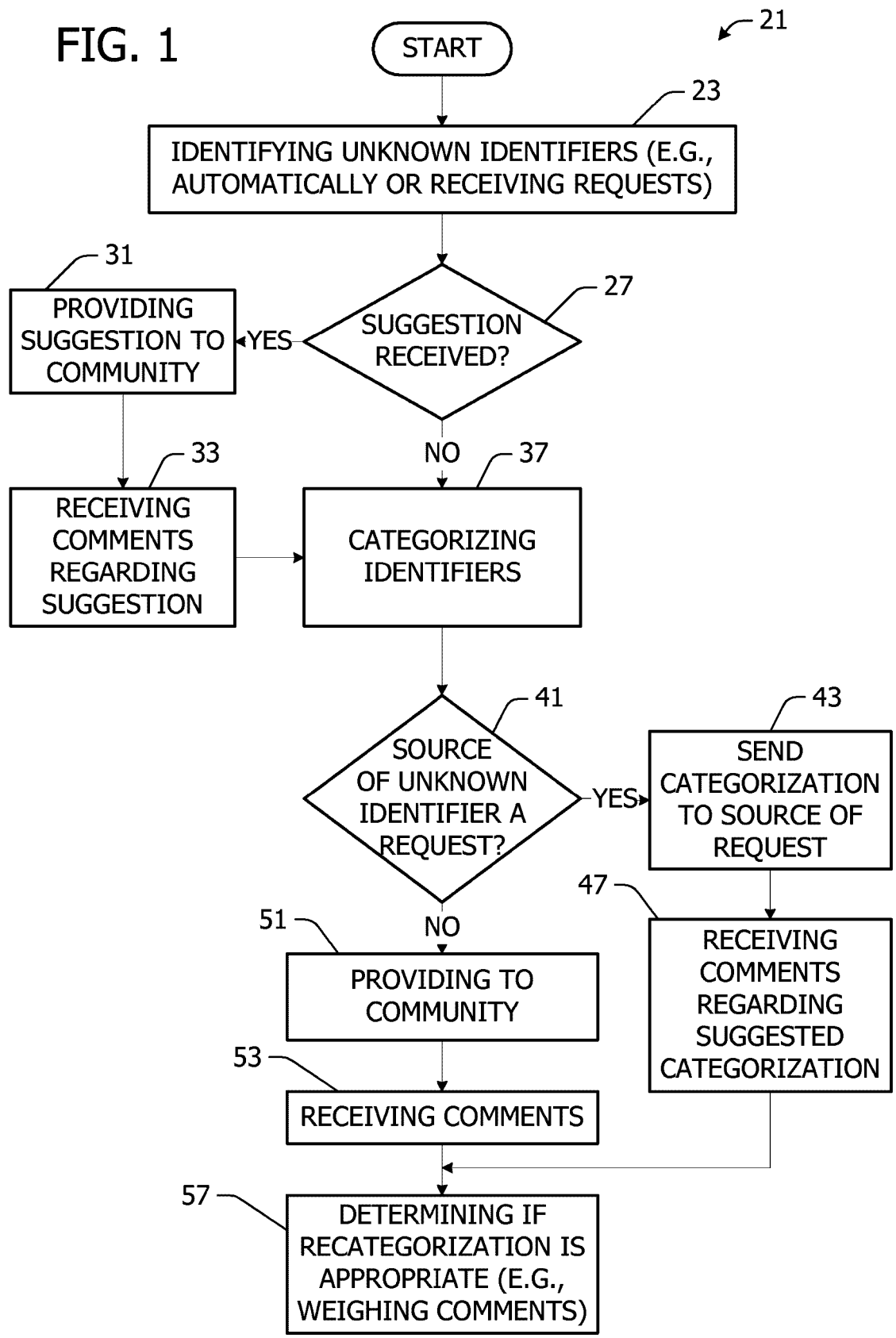
FIG. 1 is a flow diagram of a computer-implemented method of one embodiment of the invention.

Referring now to FIG. 1, a computer-implemented method for updating a computerized catalog of hardware device and software object identifiers is generally indicated at 21. Such hardware device and software object identifiers are sometimes referred to as signatures. Such identifiers can take virtually any form and can identify any hardware device or software object. Software and hardware suppliers, however, do not subscribe to a standard format or scheme for such identifiers. Thus, such identifiers, although often rich with information and solely indicative of a particular device or object, are not readily identifiable upon their face. Many such identifiers are unknown. Further details of such identifiers, or signatures, will not be discussed in greater detail here, as they would be readily understood by one skilled in the art. Returning to FIG. 1, the method 21 comprises identifying, at 23, identifiers associated with at least one of hardware devices and software objects, wherein the identity of such identifiers is unknown. In one alternative embodiment, the identifying 23 identifiers comprises automatically locating identifiers associated with at least one of hardware devices and software objects without user intervention. For example, a simple system management agent can be executed on each of a group of computing devices. Such agents are capable of regularly reviewing both the hardware and software associated with the computing devices and collecting identifiers associated with such hardware and software. This data can then be output to a user, such as in the form of a report generated for access via a network service, such as the Internet. Collected hardware and software identifiers that have not been collected before are identified 23 as unknown.

In another alternative embodiment, the identifying 23 identifiers associated with at least one of hardware devices and software objects comprises receiving, also at 23, requests from outside sources to identify the identifiers of unknown identity. For example, a system management software user can submit an identifier for identification. This submitted identifier may be treated as if it was automatically located, as discussed above. In the example where a request is received 23 from an outside source to identify an unknown identifier, the method may further comprise receiving, at 27, a suggestion from the outside source of the identifier of unknown identity regarding how the identifier should be categorized. For example, the outside source may suggest that the identifier is associated with an accounting program written and distributed by a particular vendor and should be categorized with other accounting programs. By receiving 27 such suggestions from an outside source associated with the suggestion, the method 21 can consider the collective expertise of entities beyond the method and system management software. In this case, the method 21 may further comprise providing, at 31, the suggested categorization of the unknown identifier to a community of users and receiving, at 33, comments on the suggested categorization of the unknown identifier from the community of users. In this manner, the collective expertise of a community of users can be utilized to determine if the suggested categorization is appropriate.

The method further comprises categorizing, at 37, each of the identifiers of unknown identity. Such categorizing 37 includes qualification of the data associated with the unknown identifiers, such as the name of the entity associated with the identifiers (e.g., publishers, etc.). In one exemplary embodiment, the categorizing comprises determining a likely entity associated each of the identifiers of unknown entity. This determination may require establishing an entity (e.g., Microsoft) where the identifier does not have one, or renaming an entity where one is misidentified, such as by misspelling (e.g., Microsift, rather than Microsoft). As would be understood by one skilled in the art, other data associated with the identifier may also be qualified, normalized, and corrected during the categorizing 37 without departing from the scope of embodiments of the invention.

Such categorizing 37 may utilize the received 27 suggestion and the received 33 comments on the suggestion introduced above. For example, comments on the suggested categorization may be aggregated and weighted according to the reputation of the source of the comments. By weighting such comments according to reputation of source, a community consensus can be developed, whereby confidence in the consensus categorization 37 improves as the number of comments increases. Other categorization schemes are also contemplated as within the scope of embodiments of the present invention.

In one alternative embodiment, the categorizing 37 comprises at least one of categorizing each of the identified identifiers according to a public categorization scheme and categorizing at least a portion of the identified identifiers according to one or more private categorization schemes. Such separate categorizations may be required where a particular private user of the catalog, such as a corporate entity, has its own private categorization scheme already developed that it does not wish to share with the public community. For example, a private entity (e.g., a corporation) maintaining system management software that utilizes a private categorization scheme for its partial set of identifiers may wish to add the additional categorized identifiers of a larger catalog. Typically in such a case, the private entity does not wish to recategorize its partial set of identifiers, so the method contemplates maintaining one or more private categorizations schemes for at least a portion of the identifiers.

In another alternative embodiment, the categorizing 37 each of the identifiers of unknown identity comprises performing a search for the identity of each of the unknown identifiers and categorizing the unknown identifier according to the search.

Next, the method 21 queries, at 41, whether the source of the unknown identifier was a received request from an outside source. In the case where a request is received 23 from an outside source to identify an unknown identifier, the method 21 may further send, at 43, a suggested categorization to the outside source requesting the identification of the identifier of unknown identity. The method 21 continues by receiving, at 47, comments from the outside source regarding the suggested categorization. In this manner, the method 21 utilizes the expertise of the outside source requesting the categorization to determine if the categorization is correct.

Where the source of the unknown identifier is not an outside source (e.g., the identifier is identified automatically), the method 21 further provides, at 51, the categorized identifiers to a community of users for review by the community of users. Again, the method 21 utilizes the expertise of outside entities to determine if categorizations of particular identifiers are appropriate. In the example noted above where the categorizing 37 can include both public and private categorization schemes, the providing 51 the categorized identifiers to a community of users can additionally comprise at least one of providing identifiers categorized according to the public categorization scheme to a public community of users and providing identifiers categorized according to the one or more private categorization schemes to a corresponding private community of users. In another alternative embodiment, the providing 51 the categorized identifiers to a community of users comprises at least one of providing the categorized identifiers for human consumption and providing the categorized identifiers for machine consumption via a software, such as a systems management software.

The method 21 continues by receiving, at 53, comments on the provided 51 categorization of the identifiers from the community of users. Such comments may be gathered in any number of ways without departing from the scope of embodiments of the present invention (e.g., message boards, voting, ratings, reviews, blogs, etc.).

Once the comments are received 47, 53, the method 21 determines, at 57, if the categorized identifiers of unknown identity should be recategorized based upon the received comments. Such a recategorization directs the method 21 back to the categorizing 37 with consideration of the received 47, 53 comments. In one alternative embodiment, the determining 57 if the categorized identifiers of unknown identity should be recategorized based upon the received comments comprises weighting the received 47, 53 comments based upon a reputation of the sources of the received comments. In this manner, those comments sources of higher reputation may be given greater weight in the recategorization than those comments from sources of lower reputation. As used herein, reputation refers only to the sources perceived ability to provide meaningful commentary on the categorization of identifiers. This reputation may be measured in any number of ways without departing from the scope of the embodiments of the present invention.

Method for Identifying Unknown Identifiers

Figure 2:
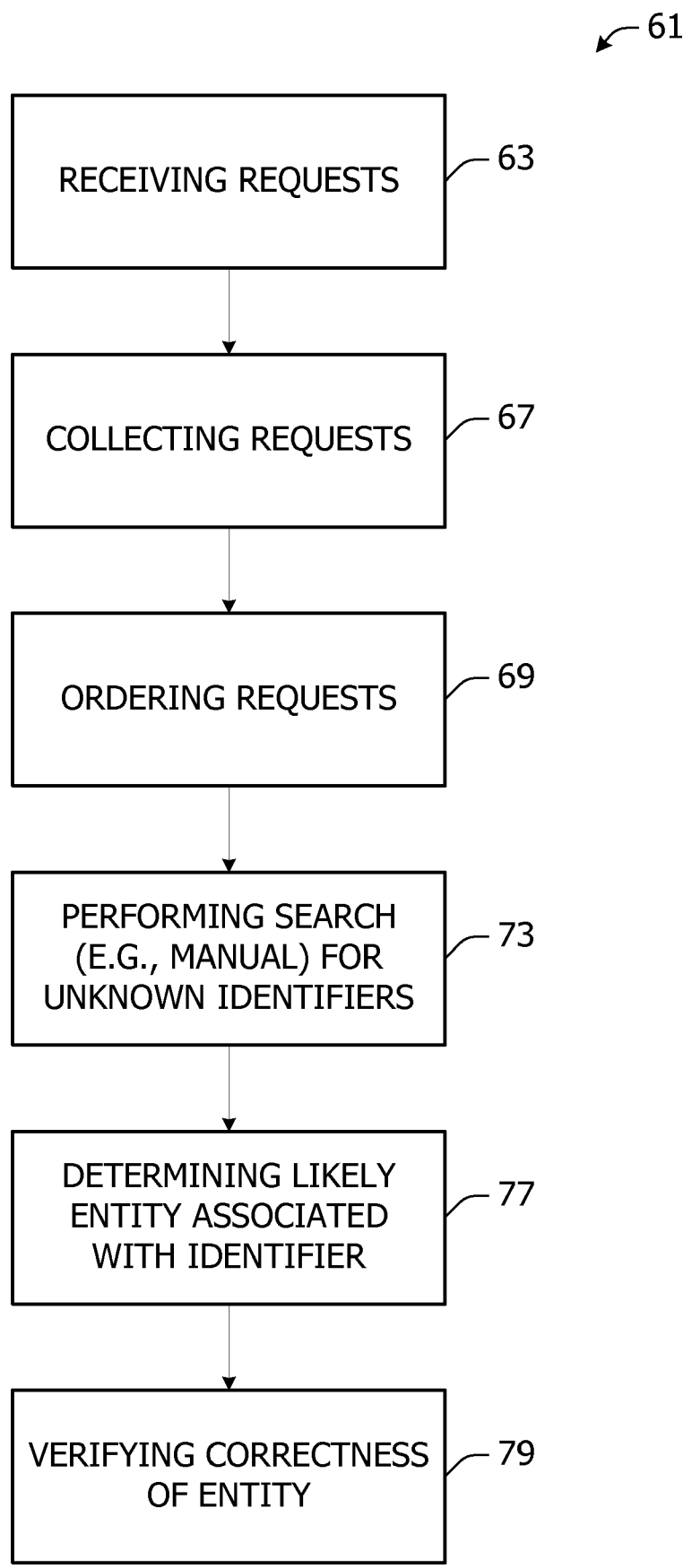
FIG. 2 is a flow diagram of a computer-implemented method of yet another embodiment of the invention.

Referring now to FIG. 2, a computer-implemented method for identifying unknown hardware device and software object identifiers is generally indicated 61. The method comprises receiving, at 63, requests for identification of unknown hardware device and software object identifiers. Such requests can be made manually, such as by IT professionals, or automatically, such as by automated agents finding identifiers not included in an identifier catalog. The method 61 further collects, at 67, the received 63 requests and orders 69 the collection of received requests according to the number of received requests for each unknown identifier.

The method 61 continues by performing, at 73, a manual search for an entity associated with the unknown identifiers.

In one alternative embodiment, the search begins with the unknown identifiers associated with the largest number of received requests. By beginning the search 73 according to the ordering 69, the frequency of the received 63 requests focuses the searching on those identifiers most often encountered by requesters. Thus, the searching 73 will help identify identifiers yielding the greatest number of fulfilled requests.

The method 61 further determines, at 77, a likely entity associated with the searched identifier. The method also verifies, at 79, the correctness of the determined entity. In one additional alternative embodiment, the verifying 79 the correctness of the determined entity comprises contacting the entity, such as by directly phoning or sending an electronic message to the entity to directly verify the correctness of the determination 77. For example, the entity associated with the identified hardware device or software object can comprises at least one of an owner, a producer, a developer, and an author of the identified hardware device or software object. Other entities not listed here are also contemplates as within the scope of embodiments of the present invention.

Method of Managing Computer Systems Components

Referring now to FIG. 3, a computer-implemented method of managing computer systems components including a plurality of hardware device and software object identifiers is generally indicated 81. The method 81 comprises generating, at 83, a catalog of computer system components (e.g., hardware devices and software objects, among other). As with the examples discussed above, some of the computer system components in such a catalog are unknown and require identification.

The method 81 further comprises receiving, at 85, information regarding the identity of a computer system component from at least two different sources. Each of the sources has a corresponding reputation, generally as set forth above. Although any number of different sources can provide such information, receiving comments and performing searching, generally as discussed above, are both capable of providing such information. In another alternative embodiment, the method 81 further comprises weighting, at 89, the information received regarding the identity of the computer system component based upon the reputation of the source.

The method 81 further determines, at 93, the identity of the computer system component based upon the received information and the reputation of the sources of the received information (e.g., the weighting 89). In this manner, the received information is utilized for the determination 93, while considering the reputation of the source of the receive information.

The method 81 further updates, at 95, the catalog of computer system components based upon the determined 93 identity of the computer system component.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A computer-implemented method for updating a computerized catalog of hardware device and software object identifiers installed on a computing device, said method comprising:
   identifying identifiers associated with at least one of hardware devices and software objects within the computing device, wherein the identity of said identified identifiers is unknown to a collection of information relating to hardware devices and software objects associated with the computing device;
   categorizing each of the identifiers of unknown identity within the computing device, said categorizing comprising qualifying data associated with the unknown identifiers, said qualified data including a name of an entity associated with the identified identifiers, said qualifying comprising at least normalizing and correcting the data associated with the unknown identifiers, said categorizing comprising at least one of the following: categorizing each of said identified identifiers according to a public categorization scheme and categorizing at least a portion of said identified identifiers according to one or more private categorization schemes;
   providing, by the computing device, the categorized identifiers with the qualified data to a community of users for review by the community of users when the identity of one or more of the unknown identifiers is not identifiable in response to the categorizing;
   receiving, by the computing device, comments on the provided categorized identifiers with the qualified data from the community of users; and
   re-categorizing the identifiers based upon the received comments, said re-categorizing comprising weighing the received comments based upon a reputation of sources of the received comments.

2. A computer-implemented method as set forth in claim 1 wherein said identifying identifiers comprises automatically locating identifiers associated with at least one of hardware devices and software objects without user intervention.

3. A computer-implemented method as set forth in claim 1 wherein said categorizing comprises determining a likely entity associated with each of the identifiers.

4. A computer-implemented method as set forth in claim 1 wherein said providing the categorized identifiers to a community of users comprises at least one of providing identifiers categorized according to the public categorization scheme to a public community of users and providing identifiers categorized according to the one or more private categorization schemes to a corresponding private community of users.

5. A computer-implemented method as set forth in claim 1 wherein said categorizing each of the identifiers of unknown identity comprises performing a search for the identity of each of the unknown identifiers and categorizing the unknown identifier according to said search.

6. A computer-implemented method as set forth in claim 1 wherein said providing the categorized identifiers to a community of users comprises at least one of providing the categorized identifiers for human consumption and providing the categorized identifiers for machine consumption via a software.

7. A computer-implemented method as set forth in claim 6 wherein said providing the categorized identifiers for machine consumption via a software comprises providing the categorized identifiers for machine consumption via a systems management software.

8. A computer-implemented method as set forth in claim 1 wherein said identifying identifiers associated with at least one of hardware devices and software objects comprises receiving requests from outside sources to identify said identifiers of unknown identity.

9. A computer-implemented method as set forth in claim 8 further comprising receiving a suggestion from the outside source of the identifier of unknown identity regarding how the identifier should be categorized.

10. A computer-implemented method as set forth in claim 9 further comprising providing the suggested categorization of the unknown identifier to a community of users.

11. A computer-implemented method as set forth in claim 10 further comprising receiving comments on the suggested categorization of the unknown identifier from the community of users.

12. A computer-implemented method as set forth in claim 8 further comprising sending a suggested categorization to the outside source requesting the identification of the identifier of unknown identity and receiving comments from the outside source regarding the suggested categorization.

13. A computer-implemented method as set forth in claim 1 wherein said determining if the categorized identifiers of unknown identity should be recategorized based upon the received comments comprises weighting said received comments based upon a reputation of the sources of the received comments.

14. A computer-implemented method for identifying unknown hardware device and software object identifiers installed on a computing device, the method comprising:
  receiving requests for identifying unknown identifiers for hardware devices and software objects installed on the computing device;
  collecting data associated with the unknown identifiers installed on the computing device;
  qualifying the collected data associated with the unknown identifiers, said qualified data including a name of an entity associated with the identified identifiers, said qualifying comprising at least one of the following:
    ordering a collection of received requests according to the number of received requests for each of the unknown identifiers,
    performing a search for the entity associated with the unknown identifiers and the qualified data associated therewith, said search beginning with the unknown identifiers associated with the largest number of received requests,
    determining a likely entity associated with the searched identifier, and
    verifying the correctness of the determined entity;
  categorizing the unknown identifiers based on the qualified data, said categorizing comprising at least one of the following: categorizing each of said identified identifiers according to a public categorization scheme and categorizing at least a portion of said identified identifiers according to one or more private categorization schemes;
  providing, by the computing device, the categorized identifiers with the qualified data to a community of users for review by the community of users when the identity of one or more of the unknown identifiers is not identifiable in response to the categorizing;
  receiving, by the computing device, comments on the provided categorized identifiers with the qualified data from the community of users; and
  re-categorizing the identifiers based upon the received comments, said re-categorizing comprising weighing the received comments based upon a reputation of sources of the received comments.

15. A computer-implemented method as set forth in claim 14 wherein said performing a search comprises performing a manual search.

16. A computer-implemented method as set forth in claim 14 wherein said verifying the correctness of the determined entity comprises contacting the entity.

17. A computer-implemented method as set forth in claim 16 wherein said entity associated with the identified hardware device or software object comprises at least one of an owner, a producer, a developer, and an author of said identified hardware device or software object.

18. A computer-implemented method of managing computer systems components, said components including a plurality of hardware device and software object identifiers, said method comprising:
  generating a catalog of computer system components including hardware devices and software objects, said generated catalog including an identifier identifying an unknown hardware device or software object;
  identifying data associated with the identifier;
  categorizing the identified data with the identifier in the generated catalog, said categorizing comprising qualifying the identified data, said qualifying comprising at least normalizing and correcting the identified data associated with the identifier, said categorizing comprising at least one of the following: categorizing each of said identified identifiers according to a public categorization scheme and categorizing at least a portion of said identified identifiers according to one or more private categorization schemes;
  in response to the qualifying, providing the categorized data to at least two sources for review, said at least two sources including a community of users;
  receiving information regarding the identifier of the unknown hardware device or software object from the at least two different sources, each of said sources having a corresponding reputation, said reputation defining only to a perceived ability of the at least two different sources to provide meaningful commentary on a categorization of the identifier;
  determining an identity of the identifier identifying the unknown hardware device or software object based upon the received information and the reputation of the sources of the received information; and
  updating the generated catalog of computer system components based upon the determined identity.

19. A computer-implemented method as set forth in claim 18 wherein said determining the identity further comprises weighting the received information based upon the corresponding reputation of each of the sources.

* * * * *

UNITED STATES PATENT AND TRADEMARK OFFICE
Certificate

Patent No. 7,647,325 B2

Patented: January 12, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ram P. Papatla, Sammamish, WA (US); John Leo Ellis, Sammamish, WA (US); Mario Hewardt, Sammamish, WA (US); David James Armour, Bellevue, WA (US); and Bhavini Soneji, Redmond, WA (US).

Signed and Sealed this Fifteenth Day of March 2011.

MOHAMMAD ALI
*Supervisory Patent Examiner*
Art Unit 2158
Technology Center 2100